(12) United States Patent
Drake (10) Patent No.: US 11,741,390 B2
(45) Date of Patent: Aug. 29, 2023

(54) COOKING SYSTEM AND METHOD FOR MAKING RECIPE SUGGESTIONS IN REAL TIME

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 1034 days.

(21) Appl. No.: 16/398,528

(22) Filed: Apr. 30, 2019

(65) Prior Publication Data

US 2020/0351557 A1    Nov. 5, 2020

(51) Int. Cl.
| | | |
|---|---|---|
| G09B 19/00 | (2006.01) | |
| G06N 20/00 | (2019.01) | |
| H04N 21/466 | (2011.01) | |
| A47J 27/00 | (2006.01) | |
| A47J 36/00 | (2006.01) | |
| G06F 18/24 | (2023.01) | |
| G06V 10/764 | (2022.01) | |
| G06V 10/82 | (2022.01) | |
| G06V 20/52 | (2022.01) | |

(52) U.S. Cl.
CPC ............ *G06N 20/00* (2019.01); *A47J 27/002* (2013.01); *A47J 36/00* (2013.01); *G06F 18/24* (2023.01); *G06V 10/764* (2022.01); *G06V 10/82* (2022.01); *G06V 20/52* (2022.01); *G09B 19/0092* (2013.01); *H04N 21/4668* (2013.01)

(58) Field of Classification Search
CPC ... G09B 19/0092; G06K 9/6267; A47J 36/00; A47J 27/002; H04N 21/4668
USPC .......................................................... 434/127
See application file for complete search history.

(56) References Cited

U.S. PATENT DOCUMENTS

| | | |
|---|---|---|
| 8,419,433 B2 | 4/2013 | Do et al. |
| 2011/0213667 A1 | 9/2011 | Ierullo |
| 2012/0136864 A1 | 5/2012 | Ochtel |
| 2014/0149239 A1 | 5/2014 | Argue et al. |
| 2018/0146811 A1 | 5/2018 | Grimaldi et al. |

FOREIGN PATENT DOCUMENTS

CN          107703830 A      2/2018

*Primary Examiner* — Kesha Frisby
(74) *Attorney, Agent, or Firm* — Dority & Manning, P.A.

(57) ABSTRACT

A cooking system and methods are provided. The cooking system includes a cooking appliance and an interactive assembly. The interactive assembly includes a display device that presents various images and information to a user, e.g., suggested recipes. An image capture device of the system can capture one or more images of food items being cooked, and based on the captured images, a controller of the system can classify the food item and can determine one or more parameters indicative of how the food item is or has been cooked by the cooking appliance. Thereafter, a machine-learned model of the controller determines one or more suggested recipes to present to a user based on the classification of the food item and how the food item is prepared. Then, the suggested recipes are presented to a user.

20 Claims, 7 Drawing Sheets

COOKING SYSTEM AND METHOD FOR MAKING RECIPE SUGGESTIONS IN REAL TIME

FIELD OF THE INVENTION

The present subject matter relates generally to cooking systems and methods for suggesting recipes to users in real time based at least in part on one or more captured images of food items being cooked by a cooking appliance.

BACKGROUND OF THE INVENTION

Many consumers enjoy cooking and trying new foods. Accordingly, many consumers delight in and relish learning of new recipes. Traditionally, consumers could find recipes in cookbooks, advertisements, and in product packages. Today, recipes are available in electronic format through Internet sites and on certain applications executable on electronic devices. Such applications can suggest certain recipes to users. However, in order to have the Internet site or application suggest certain recipes, one or more manual user inputs have been required and the user has to search through or for the recipes presented. This can be time consuming and an inconvenience to a user.

Accordingly, improved systems and methods that address one or more of the challenges noted above would be useful.

BRIEF DESCRIPTION OF THE INVENTION

Aspects and advantages of the invention will be set forth in part in the following description, or may be obvious from the description, or may be learned through practice of the invention.

In one aspect, a cooking system is provided. The cooking system includes a cooking appliance for cooking a food item. The cooking system also includes an interactive assembly. The interactive assembly includes an image capture device and a display device. Further, the interactive assembly includes one or more computing devices communicatively coupled with the display device and the image capture device, the one or more computing devices configured to: receive, from the image capture device, data indicative of one or more captured images of the food item being cooked by the cooking appliance during a cooking operation; determine one or more first cooking parameters based at least in part on the data, the one or more first cooking parameters indicative of a manner in which the food item is being cooked by the cooking appliance during the cooking operation; determine, by a machine-learned model of the one or more computing devices, one or more suggested recipes to present to a user based at least in part on the one or more first cooking parameters determined; and cause the one or more suggested recipes to be displayed on the display device.

In another aspect, a method is provided. The method includes receiving, by one or more computing devices, data indicative of one or more captured images of a food item being cooked by a cooking appliance during a cooking operation. Further, the method includes classifying, by the one or more computing devices, the food item into one or more food item categories based at least in part on the received data. The method also includes determining, by the one or more computing devices, one or more first cooking parameters based at least in part on the received data, the one or more first cooking parameters indicative of a manner in which the food item is being cooked by the cooking appliance during the cooking operation. The method further includes determining, by a machine-learned model of the one or more computing devices, one or more suggested recipes to present to a user based at least in part on the classification of the food item in one or more of the food item categories and the one or more determined first cooking parameters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

A cooking system and method are provided. In one aspect, the cooking system includes a cooking appliance (e.g., a cooktop appliance) and an interactive assembly. Generally, the cooking system is operable to learn the cooking habits of a user and suggest recipes in real time based on the learned cooking habits. Particularly, as the user cooks a food item more and more, data is collected about how the food item is cooked during a cooking operation. The data can be collected by various devices, including an image capture device, one or more sensors, timers, etc. Various cooking parameters indicative of the manner in which the food item is cooked can be received as part of the data and/or determined by the data. Example cooking parameters include cooking temperatures, heat element inputs, cook times, cookware used, size of food, etc. Such cooking parameters are indicative of the cooking habits of the user. The cooking system is operable to automatically detect when a user is cooking a certain dish or food item and store and evaluate information about the cooked food item. As the system learns more about particular food items the user cooks, the system can suggest different recipes (e.g., other main dishes, side dishes, new recipes) that the user may enjoy without need for the user to consult a recipe application or enter the recipes they are cooking. The suggested recipes can be presented to the user via the interactive assembly.

Figure 1:
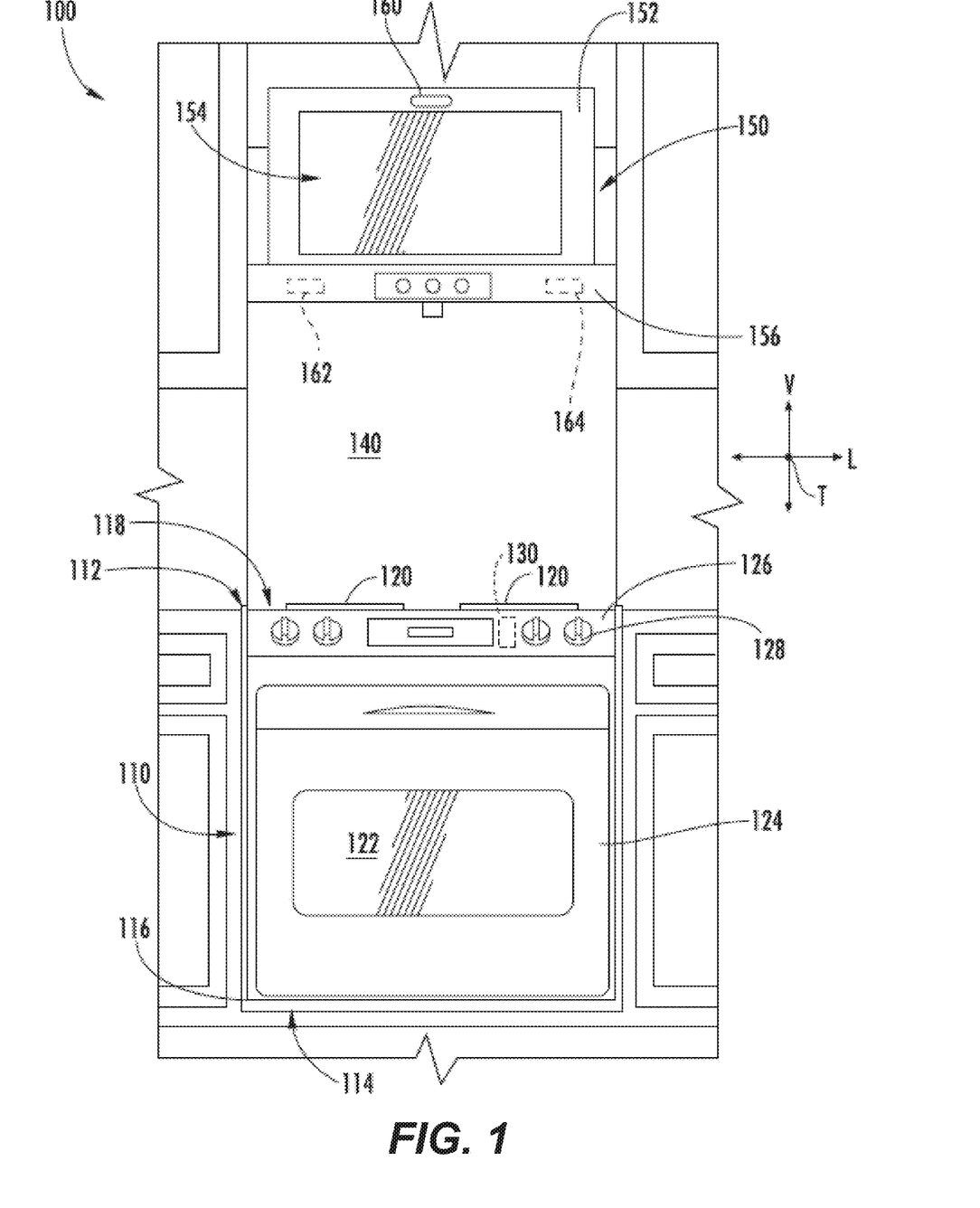
FIG. 1 provides a front perspective view of a cooking system according to exemplary embodiments of the present subject matter.
Figure 2:
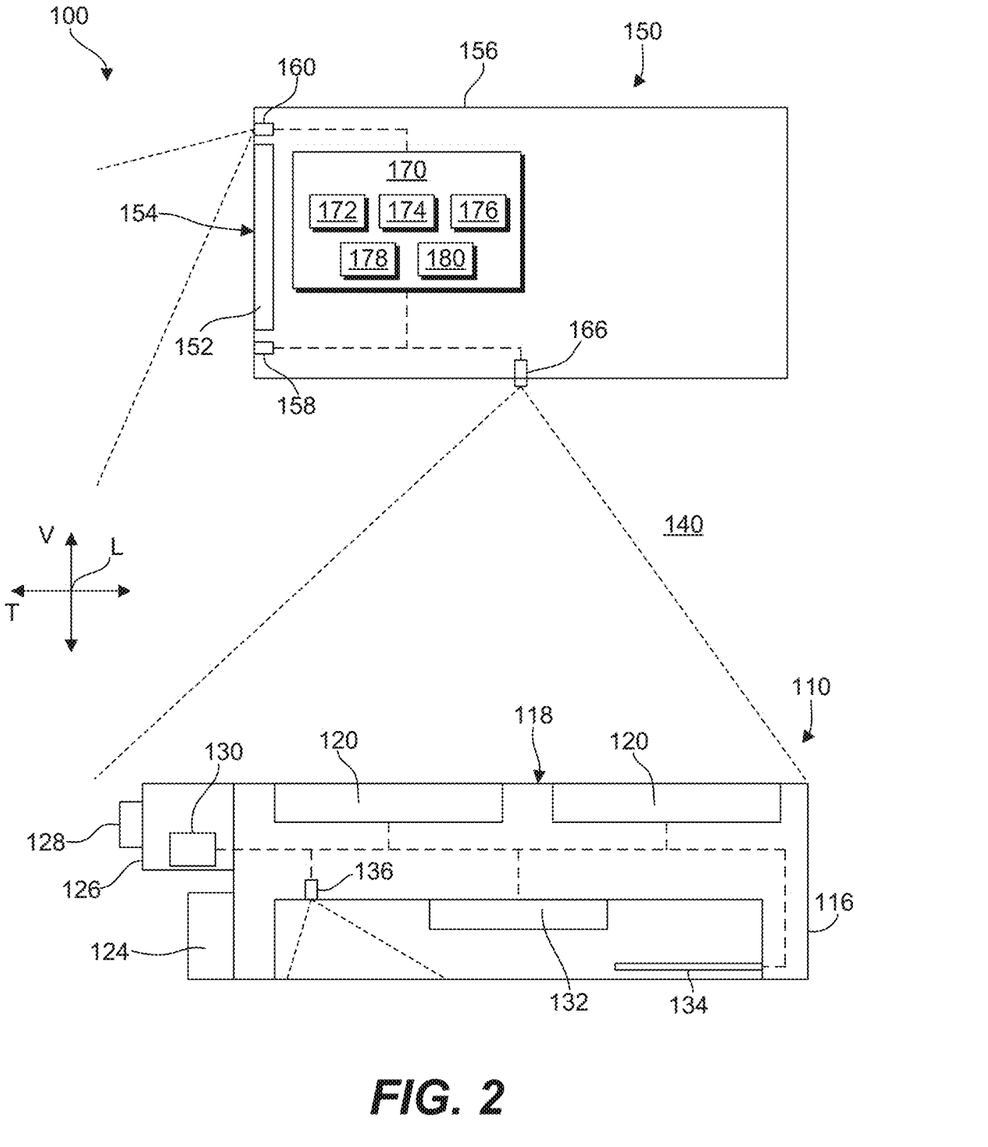
FIG. 2 provides a side schematic view of the cooking system of FIG. 1.

FIGS. 1 and 2 provide views of a cooking system 100 according to an example embodiment of the present subject matter. Particularly, FIG. 1 provides a front view of cooking system 100 and FIG. 2 provides a side schematic view of cooking system 100. Generally, cooking system 100 includes a cooking appliance 110 and an interactive assembly 150 positioned directly above cooking appliance 110. In some embodiments, however, interactive assembly 150 need not be positioned above cooking appliance 110. For this embodiment, cooking appliance 110 is a range appliance having an oven and a cooktop appliance as shown in FIG. 1. However, in alternative embodiments, cooking appliance 110 can be other suitable cooking appliances, such as e.g., a standalone cooktop appliance mounted to a kitchen counter. Further, in some embodiments, cooking system 100 can include multiple cooking appliances. For instance, cooking system 100 can include two (2) or more range appliances.

Cooking appliance 110 defines a vertical direction V, a lateral direction L, and a transverse direction T. The vertical, lateral, and transverse directions V, L, T are mutually perpendicular and form an orthogonal direction system. For this embodiment, cooking appliance 110 extends between a top portion 112 and a bottom portion 114, e.g., along the vertical direction V; between a left side portion and a right side portion, e.g., along the lateral direction L; and between a front portion and a rear portion, e.g., along the traverse direction T.

Cooking appliance 110 includes a chassis or cabinet 116 and a cooktop surface 118 having one or more cooktop heating elements 120 for use in, for example, heating or cooking operations. In some embodiments, cooktop surface 118 is constructed with ceramic glass. In other embodiments, however, cooktop surface 118 may be formed of another suitable material, such as a metallic material (e.g., steel) or another suitable non-metallic material. Heating elements 120 may be various sizes and may employ any suitable method for heating or cooking an object, such as a cookware and its contents. In some embodiments, for example, heating element 120 uses a heat transfer method, such as electric coils or gas burners, to heat the cookware. In other embodiments, however, heating element 120 uses an induction heating method to heat the cookware directly. Accordingly, the cooktop heating elements 120 can be a gas burner element, resistive heat element, radiant heat element, induction element, or another suitable heating element.

Cabinet 116 is insulated and defines a cooking chamber 122 selectively covered by a door 124. One or more oven heating elements 132 (FIG. 2) can be enclosed within cabinet 116 to heat cooking chamber 122. The oven heating elements 132 can be provided as any suitable type of element for cooking food items disposed within cooking chamber 122, such as an electric resistive heating element, a gas burner, a microwave element, a halogen element, etc. The oven heating elements 132 can be provided as top broiling elements or bottom baking elements, for example. As cooking appliance 110 includes both a cooktop appliance and an oven appliance, cooking appliance 110 can be referred to as an "oven range appliance" or simply "range appliance". It will be appreciated however that cooking appliance 110 is provided by way of example only, and the present subject matter can be used in the context of any suitable cooking appliance, as previously noted. Thus, the example embodiments illustrated in the figures are not intended to limit the present subject matter to any particular cooking chamber or heating element configuration, except as otherwise indicated.

As shown best in FIG. 2, the oven appliance of cooking appliance 110 includes one or more sensors 134 (FIG. 2) operable to collect or sense various parameters. For instance, sensor 134 can be a temperature sensor operable to sense the temperature within chamber 122. As further shown in FIG. 2, cooking appliance 110 has an image capture device 136 operable to capture one or more images of food items disposed within chamber 122, e.g. during a cooking operation. The image capture device 136 can be operable to capture still images or pictures, video, or a combination thereof.

Further, cooking appliance 110 includes a user interface panel 126, e.g., positioned at the forward portion of cooking appliance 110. Although shown at the front portion of cooking appliance 110, other suitable locations or structures (e.g., a backsplash) for supporting user interface panel 126 can be provided in alternative embodiments. For this embodiment, user interface panel 126 includes input components or controls 128, such as one or more of a variety of electrical, mechanical, or electro-mechanical input devices. Controls 128 may include, for example, rotary dials, knobs, push buttons, and touch pads. A controller 130 for controlling cooking appliance 110 is communicatively coupled with user interface panel 126, oven heating element 132, sensor 134, and image capture device 136, e.g., by a suitable wired or wireless connection. Controller 130 may also be communicatively coupled with other components of cooking appliance 110 as well. Input/output ("I/O") signals can be routed between controller 130 and the various operational components of cooking appliance 110. Thus, a user may select various operational features and modes via controls 128 of user interface panel 126 and controller 130 can execute a cooking operation based on the selected features and modes. Moreover, controller 130 can receive data from various devices, including the cooktop heating elements 120, oven heating elements 132, the sensor 134, and image capture device 136. In some embodiments, user interface panel 126 includes a display device, such as a digital or analog display, communicatively coupled with controller 130. The display component is configured to provide operational feedback to a user. In certain embodiments, user interface panel 126 represents a general purpose I/O ("GPIO") device or functional block. In yet other embodiments, feedback can be provided or presented to a use via interactive assembly 150.

In some embodiments, controller 130 includes one or more memory devices and one or more processors. The processors can be any combination of general or special purpose processors, CPUs, or the like that can execute programming instructions or control code associated with operation of cooking appliance 110. The memory devices (i.e., memory) may represent random access memory such as DRAM or read only memory such as ROM or FLASH. In some embodiments, the processor executes programming instructions stored in memory. The memory may be a separate component from the processor or may be included onboard within the processor. Alternatively, controller 130 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 130 includes a network interface such that controller 130 can connect to and communicate over one or more networks with one or more network nodes. Controller 130 can also include one or more transmitting, receiving, or transceiving components for transmitting/receiving communications with other devices communicatively coupled with cooking appliance 110. Additionally or alternatively, one or more transmitting, receiving, or transceiving components can be located off board controller 130. Generally, controller 130 can be positioned in any suitable location throughout cooking appliance 110. For example, controller 130 may be located proximate user interface panel 126 toward front portion of cooking appliance 110.

As further shown in FIGS. 1 and 2, cooking system 100 includes interactive assembly 150. Generally, interactive assembly 150 includes features for facilitating cooking operations and for presenting certain information to a user, such as e.g., recipe suggestions. Interactive assembly 150 includes a display device 152 for visually presenting content to users, such as e.g., one or more suggested recipes or guided cooking videos. Display device 152 can be any suitable type of mechanism for visually presenting an image (e.g., a digital image). For example, display device 152 may be a liquid crystal display (LCD), a plasma display panel (PDP), a cathode ray tube (CRT) display, etc. Display device 152 includes an image surface or screen 154 on which images are presented or displayed as an optically-viewable picture (e.g., static image or dynamic video) to a user. Optionally, a protective transparent panel (e.g., formed from a transparent glass, plastic, etc.) can be positioned across or over screen 154. For this embodiment, screen 154 of display device 152 is a touchscreen that provides an interface for users to interact with display device 152, or more broadly, interactive assembly 150. Thus, display device 152 is a touchscreen display device in this embodiment. In this way, a user can touch various digitally presented images to control various features of interactive assembly 150, cooking appliance 110, or other features or appliances. In alternative embodiments, display device 152 need not include a touchscreen. Rather, in such embodiments, interactive assembly 150 can include one or more input selectors 158 (FIG. 2) for interacting with interactive assembly 150. In addition, in some embodiments, display device 152 can include touchscreen 154 and input selectors 158.

For this embodiment, screen 154 of display device 152 is oriented orthogonal to cooktop surface 118 and generally faces, or is directed away from, cooktop surface 118. In particular, screen 154 is directed toward an area forward of cooking appliance 110. During use, a user standing in front of cooking appliance 110 may view the optically-viewable images (e.g., recipe suggestions, dynamic video stream, graphical user interface, etc.) displayed at screen 154. Optionally, the screen 154 can be positioned at an angle, e.g., with a downward or upward tilt for ease of viewing. Display device 152 is encased within a casing 156. Casing 156 can include various mounting features, e.g., for mounting interactive assembly 150 to a kitchen wall or vent. Casing 156 can be mounted to any suitable structure. For this embodiment, casing 156 is mounted such that interactive assembly 150 is spaced from cooktop surface 118 along the vertical direction V. An open region 140 may thus be defined along the vertical direction V between cooktop surface 118 of cooking appliance 110 and a bottom end of casing 116. Further, casing 156 can include cooling and ventilation features, e.g., for cooling the internal electronic components and for preventing condensation buildup on touchscreen 154.

Interactive assembly 150 can include other features that facilitate interaction with interactive assembly 150. For instance, for this embodiment, interactive assembly 150 includes a downward-looking or first image capture device 166 and a forward-looking or second image capture device 160 operable to capture one or more images (e.g., still images or pictures, video, or a combination thereof). Interactive assembly 150 also includes a microphone 162 (e.g., for providing voice commands to interactive assembly 150), and a speaker 164 (e.g., for providing audio feedback or instructions from interactive assembly 150). First image capture device 166, second image capture device 160, microphone 162, and/or speaker 164 can be mounted to casing 156, to display device 152, or some other suitable structure of interactive assembly 150. In some embodiments, first image capture device 166, second image capture device 160, microphone 162, and/or speaker 164 can be integral with display device 152.

As further shown in FIG. 2, interactive assembly 150 includes a controller 170. Controller 170 is communicatively coupled with various components of interactive assembly 150 and other components of cooking system 100, such as cooking appliance 110. For this embodiment, controller 170 includes one or more processor(s) 172 and one or more memory device(s) 174. The processor(s) 172 of controller 170 can be any suitable processing device, such as a microprocessor, microcontroller, integrated circuit, or other suitable processing device. The memory device(s) 174 of controller 170 can include any suitable computing system or media, including, but not limited to, non-transitory computer-readable media, RAM, ROM, hard drives, flash drives, or other memory devices. The memory device(s) 174 of controller 170 can store information and/or data accessible by processor(s) 172 of controller 170, including instructions that can be executed by processor(s) 172 of controller 170 in order to provide functionality to interactive assembly 150 or components communicatively coupled thereto. For instance, controller 170 can execute one or more software applications, e.g., control logic for certain functionality operations and a machine-learned model 180, e.g., for determining the cooking habits of a user. Controller 170 can also execute one or more software applications, e.g., for obtaining recipe content from various sources based on the determined cooking habits and ultimately causing display device 152 to visually present suggested recipe content to a user. Moreover, the memory device(s) 174 can include a recipe repository 176, e.g., for storing recipe content.

Controller 170 includes a communication interface 178 operable to communicatively couple or connect interactive assembly 150 with various networks, such as e.g., network 190 (FIG. 3), as well as other components of cooking system 100, such as cooking appliance 110. Communication interface 178 can include suitable components for interfacing with one more networks or other devices. For example, communication interface 178 can include transmitters, receivers, ports, controllers, antennas, or other suitable components for interfacing with network 190 and/or other devices. Communication interface 178 can establish communication with a network in any suitable manner, e.g., via a wired or wireless communication link, and with any suitable protocol. Controller 170 can provide control functionality for communication interface 178.

Figure 3:
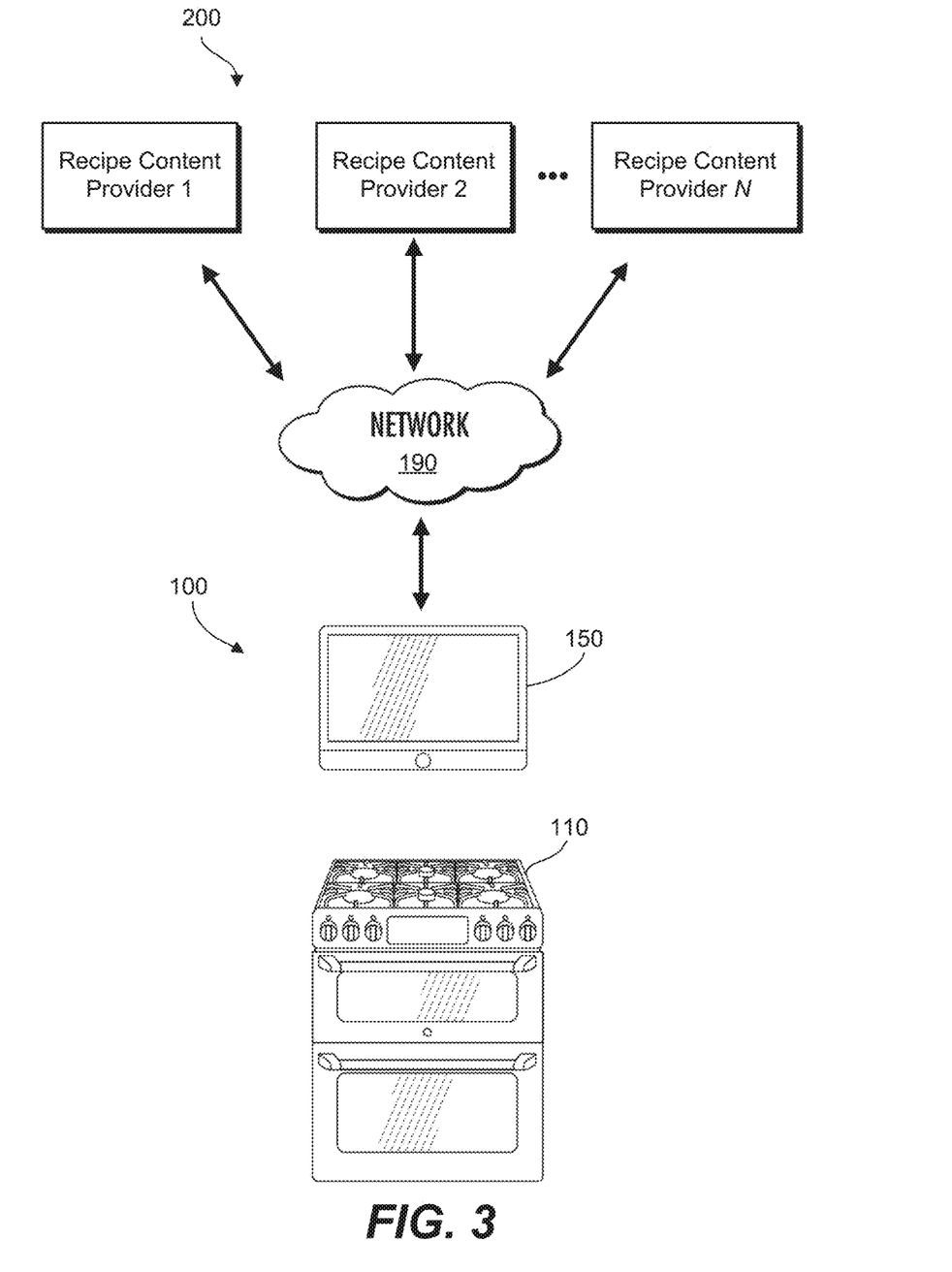
FIG. 3 provides a schematic view of the cooking system of FIG. 1 communicatively coupled with one or more recipe content providers via a network according to exemplary embodiments of the present subject matter.

FIG. 3 provides a schematic view of the cooking engagement system communicatively coupled with one or more recipe content providers. As noted above, controller 170 of interactive assembly 150 includes communication interface 178 that is operable to connect interactive assembly 150 with various networks, such as e.g., network 190. Network 190 can be any suitable type of network, such as a local area network (e.g., intranet), wide area network (e.g., internet), low power wireless networks, e.g., Bluetooth Low Energy (BLE), or some combination thereof and can include any number of wired or wireless links. In general, communication over network 190 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

As further depicted in FIG. 3, one or more recipe content providers 200 are communicatively coupled with cooking system 100 via network 190. Particularly, the one or more recipe content providers 200 are communicatively coupled with controller 170 of interactive assembly 150, e.g., via network 190. For example, as depicted in FIG. 2, a first Recipe Content Provider 1, a second Recipe Content Provider 2, and so on to the Nth Recipe Content Provider N are communicatively coupled with interactive assembly 150 via network 190. Any suitable number of recipe content providers 200 can be communicatively coupled with interactive assembly 150. In some embodiments, the one or more recipe content providers 200 are third party recipe content providers. That is, the recipe content providers 200 are separate entities from the manufacturer and/or or operator of the interactive assembly 150. The recipe content providers 200 can include one or more computing or storage devices for storing recipe content. As will be explained more fully below, the recipe content stored on the one or more computing or storage devices of the recipe content providers 200 can be obtained by controller 170 of interactive assembly 150, compiled, and ultimately presented to a user via display device 152.

Figure 4:
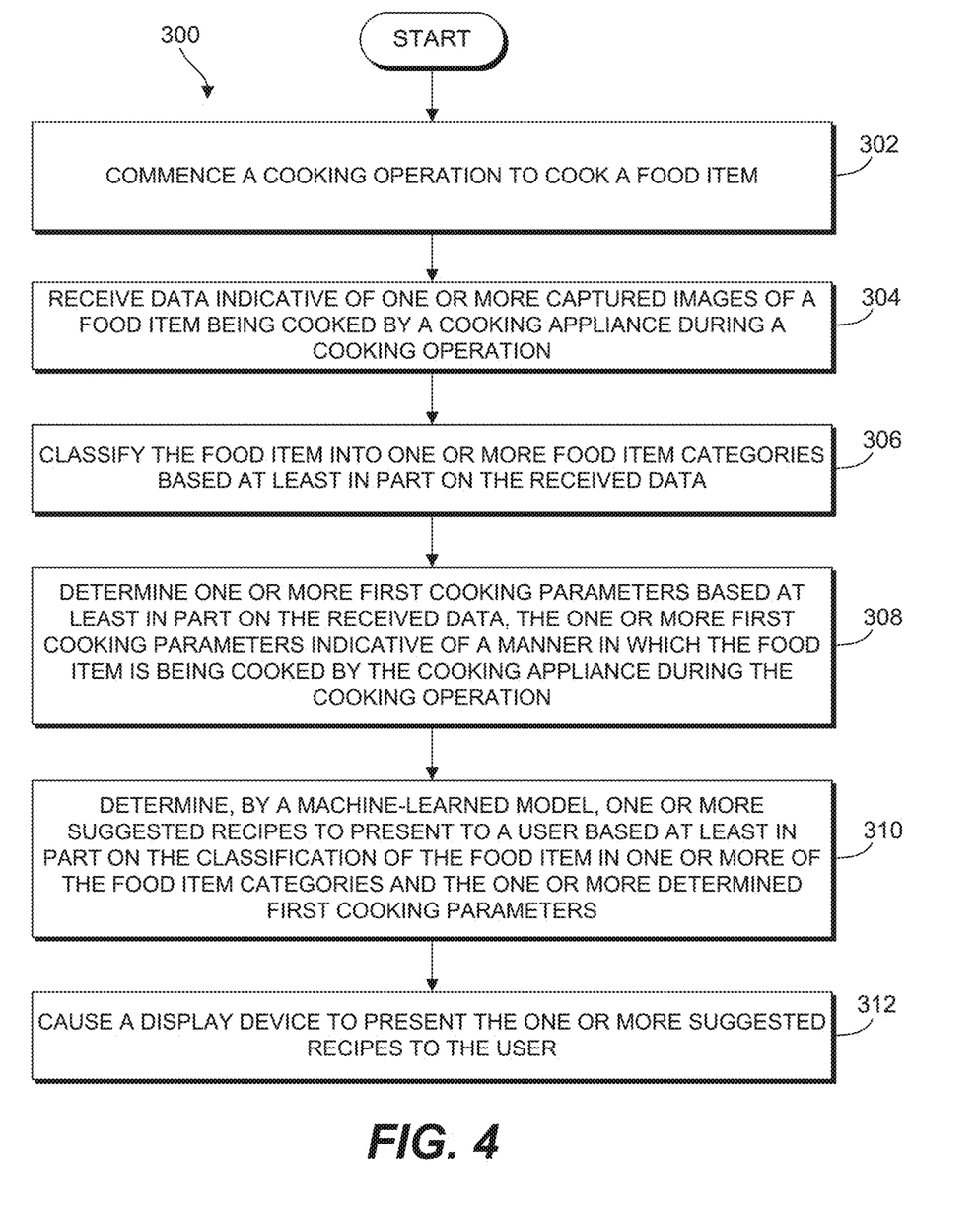
FIG. 4 provides a flow diagram for a method of operating the cooking system of FIG. 1 according to example embodiments of the present subject matter.

FIG. 4 provides a flow diagram for an example method (300) of operating cooking system 100 according to example embodiments of the present subject matter. It will be appreciated, however, that method (300) is not limited in scope to the cooking system 100 of FIGS. 1 through 3; rather, method (300) is applicable to other suitable cooking systems as well. Some or all of the method (300) can be implemented by one or both of the controllers 130, 170 described herein. In addition, it will be appreciated that exemplary method (300) can be modified, adapted, expanded, rearranged and/or omitted in various ways without deviating from the scope of the present subject matter.

At (302), the method (300) includes commencing a cooking operation to cook a food item. As one example, a food item can be placed into a cookware and placed on one of the cooktop heating elements 120 of the cooktop appliance of cooking appliance 110. The user can then activate the cooktop heating element 120, e.g., by manipulating one of the controls 128 of user interface panel 126. Thermal energy can then be applied to the cookware and food items disposed therein by cooktop heating element 120. As another example, a food item can be placed into or onto a cookware and placed within chamber 122 of the oven appliance of cooking appliance 110. The user can then activate the oven heating element 132, e.g., by manipulating one of the controls 128 of user interface panel 126. Thermal energy can then be applied to the cookware and food items disposed therein by oven heating element 132.

Figure 5:
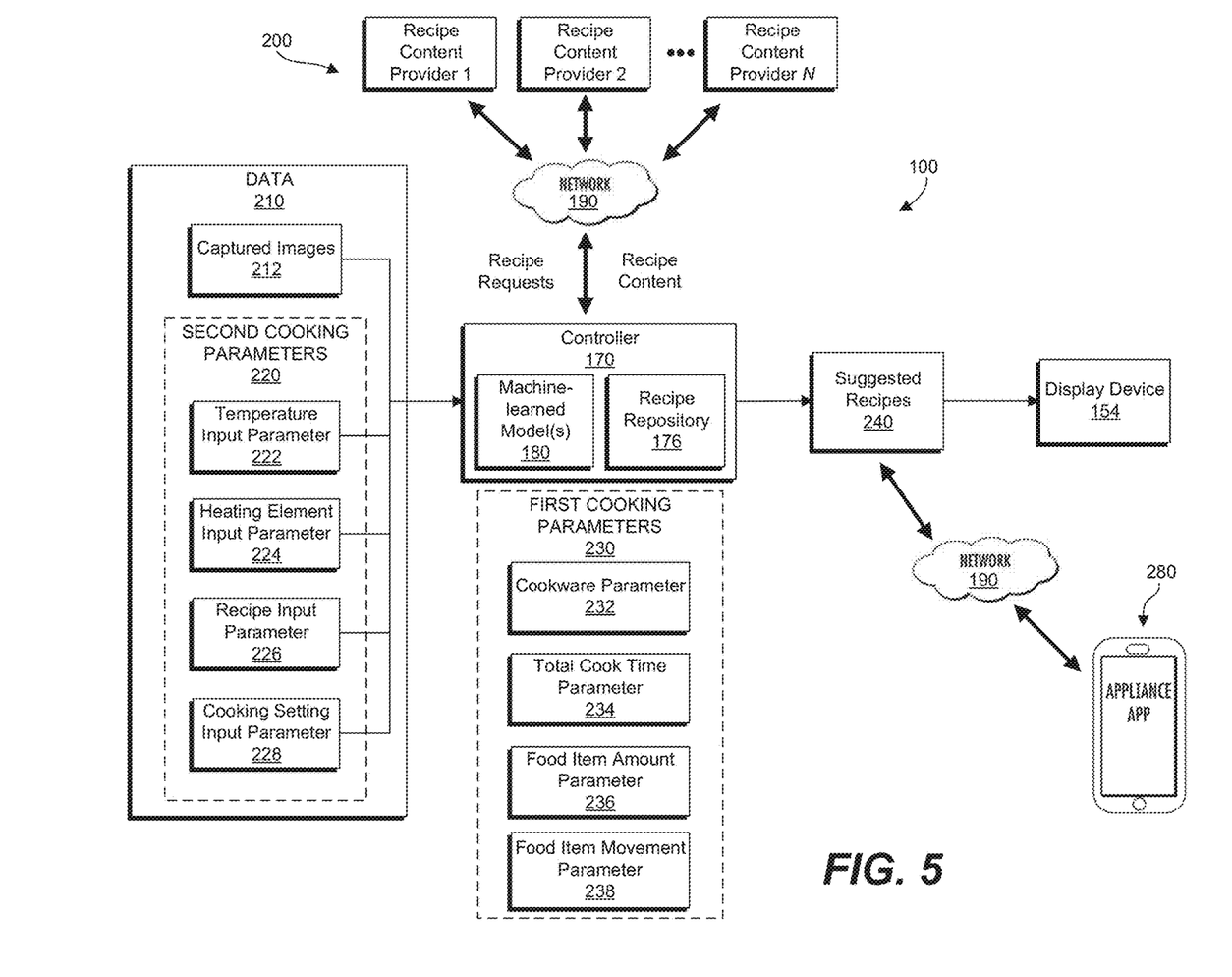
FIG. 5 provides a schematic diagram of the cooking system of FIG. 1.

At (304), the method (300) receiving, by one or more computing devices, data indicative of one or more captured images of a food item being cooked by a cooking appliance during a cooking operation. FIG. 5 provides a block diagram of cooking system 100. As depicted, data 210 is received by controller 170. Particularly, data 210 indicative of one or more captured images 212 of a food item being cooked by the cooking appliance during a cooking operation is received by controller 170. The data can be received from an image capture device of the cooking appliance and/or an interactive assembly positioned above the cooking appliance along the vertical direction. As one example, controller 170 can receive data from first image capture device 166. Particularly, controller 170 can receive data indicative of one or more captured images of a food item being cooked on one of the heating elements 120 of the cooktop appliance of cooking appliance 110 during a cooking operation, e.g., as shown in FIG. 2. As another example, controller 170 can receive data from second image capture device 160. Specifically, controller 170 can receive data indicative of one or more captured images of a food item being cooked on one of the heating elements 120 of the cooktop appliance of cooking appliance 110 during a cooking operation, e.g., as shown in FIG. 2. Additionally, second image capture device 160 can capture the movement and operations of the user while the user is cooking the food item. For instance, second image capture device 160 can capture if the user is flipping or moving the food item during the cooking operation. As yet another example, controller 170 can receive data from oven image capture device 136. Controller 170 can receive data indicative of one or more captured images of a food item being cooked within chamber 122 of the oven appliance of cooking appliance 110 during a cooking operation, e.g., as shown in FIG. 2. First image capture device 166, second image capture device 160, and/or oven image capture device 136 are operable to capture the one or more images as at least one of a plurality of still pictures and a video stream.

In some implementations, as further shown in FIG. 5, the data 210 can include one or more second cooking parameters 220 indicative of the manner in which the food item is being or is to be cooked by the cooking appliance during the cooking operation. Generally, the second cooking parameters are received inputs by controller 170. By way of example, without limitation, the one or more second cooking parameters 220 can include one or more of i) a temperature input parameter 222 indicative of a temperature within a chamber defined by the cooking appliance during the cooking operation, ii) a heating element input parameter 224 indicative of an amount of thermal energy provided by a heating element of the cooking appliance to the food item during the cooking operation, iii) a recipe input parameter 226 indicative of preparation instructions for cooking the food item, and iv) a cooking setting input parameter 228 indicative of one or more cooking settings used by the cooking appliance to cook the food item during the cooking operation.

The temperature input parameter 222 can be indicative of the temperature within chamber 122 defined by the oven appliance of cooking appliance 110. The controller 170 can receive the temperature input parameter 222 from sensor 134, for example. Particularly, the temperature reading can be routed to controller 130 and then to controller 170 for processing. By receiving the temperature input parameter 222, controller 170 can learn/know how the food item is cooked by the oven appliance of cooking appliance 110. In some embodiments, the temperature input parameter 222 can be indicative of the temperature at one of the heating elements 120 of the cooktop appliance of the cooking appliance 110. For instance, a sensor can be positioned proximate the heating element 120 and can capture or collect the temperature at the heating element 120.

The heating element input parameter 224 can be indicative of an amount of thermal energy provided by one of the heating elements 120 of the cooktop appliance of cooking appliance 110 to the food item during the cooking operation. The controller 170 can receive the heating element input parameter 224 from controller 130 or from a sensor positioned proximate the heating element 120 providing thermal energy to the food item disposed in a cookware positioned thereon. Further, the heating element input parameter 224 can be based on the amount of electrical power or fuel flow to the heating element 120. By receiving the heating element input parameter, controller 170 can learn/know how the food item is cooked by the cooktop appliance of cooking appliance 110. In yet other embodiments, the heating element input parameter 224 can be indicative of an amount of thermal energy provided by one of the heating elements 132 of the oven appliance of cooking appliance 110 to the food item during the cooking operation.

The recipe input parameter 226 indicative of preparation instructions for cooking the food item can be input by a user, e.g., by touching one or more graphical user interface (GUI) buttons displayed on display device 152 of interactive assembly 150. The recipe input into the cooking system 100 can provide controller 170 with information on how the food item is to be cooked, and furthermore, the controller 170 can track how closely the user follows the recipe and what, if any, adjustments were made to the recipe. In this way, as will be explained more fully below, the controller 170 can learn the cooking habits of the user.

In addition, the cooking setting input parameter 228 indicative of one or more cooking settings used by the cooking appliance to cook the food item during the cooking operation can be received as part of the data 210. For instance, if the cooking appliance 110 is set to bake, broil, or some other setting during a cooking operation, the cooking setting input parameter 228 can be indicative of such a cooking setting. By knowing the cooking settings used by the user to cook certain food items, the controller 170 can better learn how the user typically prepares certain food items. It will be appreciated that other second cooking parameter 220 can be received by the controller 170. For instance, other second cooking parameters can include a time parameter indicative of the time of day in which the food item is being cooked, among other possible parameters.

At (306), with reference to FIG. 4, the method (300) includes classifying, by the one or more computing devices, the food item into one or more food item categories based at least in part on the received data. For instance, as depicted in FIG. 5, once the controller 170 receives the data 210, and particularly the captured images 212 of the data 210, the controller 170 can classify the food item being cooked by cooking appliance 110. In some implementations, the machine-learned model 180 is utilized to classify the food item into one or more food item categories. As one example, if a user is cooking an omelet in a cookware positioned on one of the heating elements 120, the machine-learned model 180 can receive the image and determine that the food item being cooked is an omelet. In classifying the food item, the machine-learned model 180 can classify the omelet as a breakfast food and an egg-based dish, for example. If other ingredients are added, the one or more captured images can provide such details. For instance, if spinach, cheese, ham, onions, and/or the like are added to the omelet during the cooking operation, the one or more captured images can provide such details, and the machine-learned model 180 can further classify the omelet accordingly. For instance, the machine-learned model 180 can classify the omelet into one of a plurality of subcategories, such as e.g., a southwest omelet, a ham and cheese omelet, an egg white omelet, a frittata omelet, etc. In some alternative embodiments, controller 170 can classify the food item using another suitable image-recognition technique, such as e.g., by using one or more user-engineered features or food item descriptions.

In some embodiments, the machine-learned model 180 is a neural network. For instance, in some embodiments, the machined-learned model 180 is a recurrent neural network (RNN), e.g., a long short-term memory recurrent neural network (LSTM). In yet other embodiments, the machined-learned model 180 is a convolutional neural network (CNN). In some further embodiments, the machine-learned model can be another type of neural network. Moreover, in some embodiments, the machine-learned model 180 can be a model structured as one of a linear discriminant analysis model, a partial least squares discriminant analysis model, a support vector machine model, a random tree model, a logistic regression model, a naïve Bayes model, a K-nearest neighbor model, a quadratic discriminant analysis model, an anomaly detection model, a boosted and bagged decision tree model, a C4.5 model, and/or a k-means model. In some embodiments, the machine-learned model can include a plurality of models, e.g., an RNN network for image recognition and a random tree model for selecting recipes to suggest to the user.

At (308), the method (300) includes determining, by the one or more computing devices, one or more first cooking parameters based at least in part on the received data, wherein the one or more first cooking parameters indicative of a manner in which the food item is being cooked by the cooking appliance during the cooking operation. For instance, with reference to FIG. 5, controller 170 can determine one or more first cooking parameters 230 based at least in part on the received captured images 212. Particularly, in some embodiments, the machine-learned model can determine the first cooking parameters 230. In yet other embodiments, other techniques can be used.

The one or more first cooking parameters 230 can include, without limitation, one or more of i) a cookware parameter 232 indicative of one or more cookware utilized by the user during the cooking operation to cook the food item; ii) a total cook time parameter 234 indicative of a total time in which the food item was cooked during the cooking operation; iii) a food item amount parameter 236 indicative of an amount or size of the food item cooked during the cooking operation; and iv) a food item movement parameter 238 indicative of a number of times the food item is moved by user intervention during the cooking operation.

The cookware parameter 232 can be indicative of one or more cookware utilized by the user to cook the food item during the cooking operation. For instance, if a particular pot or pan is used to cook the food item, the controller 170 is configured to identify or determine the cookware used based at least in part on the captured images 212 received as part of the data 210. In some embodiments, the cookware parameter 232 can be determined by controller 170 based on a user input. By determining the cookware used to cook the food item, one or more recipes that utilize the same or similar cookware can be suggested to the user. For instance, if a user is cooking with a wok or some other cookware, recipes that utilize such cookware can be suggested to the user.

The total cook time parameter 234 indicative of the total time in which the food item was cooked during the cooking operation can also be determined based on the captured images 212 of the data 210. A plurality of still pictures of video feed from one or more of the image capture devices 160, 166, 136 and a timer of controller 170 can be used to determine the total cook time. By know the total cook time, the controller 170 can suggest certain recipes that align with a user's cooking habits. For instance, if a user typically cooks meals that take a short amount of time, recipes commensurate with such short cooking times can be suggested.

The food item amount parameter 236 indicative of the amount or size of the food item cooked during the cooking operation can be determined based on the captured images 212 of the data 210. The captured images 212 can provide the controller 170 with a 3D rendering of the volume or size of the food item being cooked, and consequently, the amount of food items being cooked can be determined. Based on the determined food item amount, recipes that provide similar amounts of food items can be suggested to the user.

The food item movement parameter 238 indicative of a number of times the food item is moved by user intervention during the cooking operation can be determined based on the captured images 212 of the data 210. The captured images 212 and a timer of controller 170 can provide the controller 170 with the information necessary to determine the movement of the food item during the cooking operation. For instance, if an omelet is being cooked, the captured images can provide information as to how many times or how frequently the omelet is flipped and at what point in the cooking process the omelet was flipped or moved. Such information can be helpful in suggesting recipes. It will be appreciated that other first cooking parameters 230 can be determined by the controller 170.

At (310), returning to FIG. 4, the method (300) includes determining, by a machine-learned model of the one or more computing devices, one or more suggested recipes to present to a user based at least in part on the classification of the food item in one or more of the food item categories and the one or more determined first cooking parameters. In some implementations, the machine-learned model of the one or more computing devices determines the one or more suggested recipes to present to the user based at least in part on the one or more received second cooking parameters as well. For instance, as shown in FIG. 5, the machine-learned model 180 of controller 170 can determine and output one or more suggested recipes 240 based at least in part on the classification of the food item in one or more of the food item categories and the one or more determined first cooking parameters 230, and in some implementations, the second cooking parameters 220.

In some implementations of method (300), determining the suggested recipes at (310) includes generating, by the machine-learned model of the one or more computing devices, a cooking session profile based at least in part on the classification of the food item in one or more of the food item categories and the one or more determined first cooking parameters. In such implementations, the method (300) can also include storing, by the one or more computing devices, the cooking session profile in a recipe repository operable to store a plurality of cooking session profiles.

Figure 6:
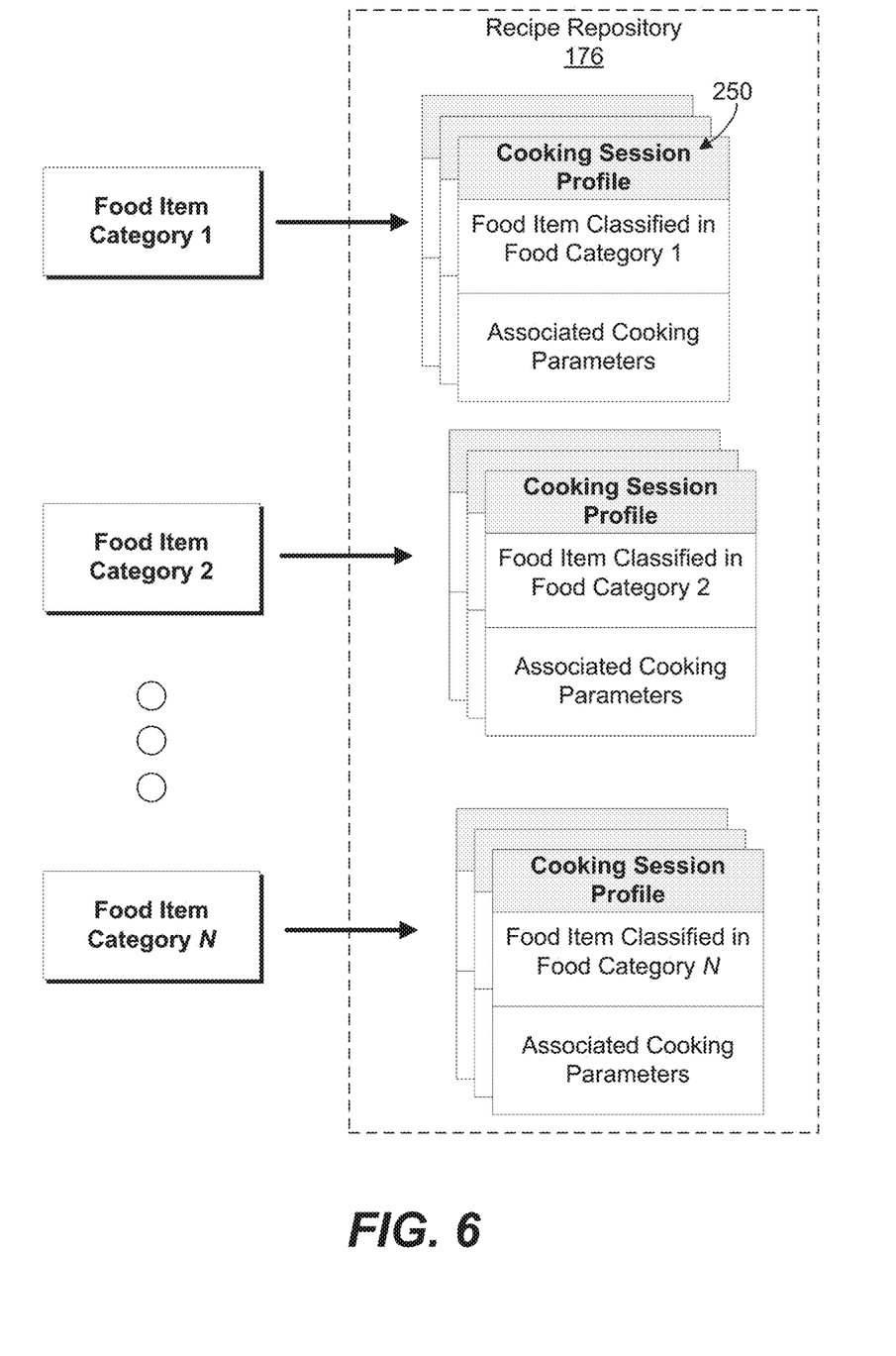
FIG. 6 provides a block diagram depicting a cooking session profile being generated and stored in a memory device of controller of the cooking system of FIG. 1.

For instance, FIG. 6 provides a block diagram depicting a cooking session profile 250 being generated and stored in a memory device of controller 170, and more particularly recipe repository 176. As shown, each cooking session profile 250 is indicative of the classification of the food item and one or more associated parameters, including e.g., the one or more determined first cooking parameters 230 and the one or more received second cooking parameters 220. During or after a cooking operation, the machine-learned model 180 can generate a cooking session profile, such as one of the cooking session profiles 250 depicted in FIG. 6, and the generated cooking session can be stored along with other previously generated cooking session profiles. Notably, the cooking session profiles can be stored by a preselected criteria, e.g., by food item category as shown in FIG. 6. In some embodiments, the generated cooking session profile can be stored by food item category, and in addition, by food item subcategory.

Further, in some implementations at (310), the method (300) includes mapping, by the machine-learned model of the one or more computing devices, the classification of the food item in one or more of the food item categories and the one or more determined first cooking parameters of the cooking session profile with one or more attributes of one or more recipes stored in the recipe repository. Further, in such implementations, the method (300) includes selecting, by the machine-learned model of the one or more computing devices, one or more of the one or more recipes stored in the recipe repository as the one or more suggested recipes to present to the user, wherein the one or more recipes stored in the recipe repository are selected as the one or more suggested recipes if a predetermined number of matches are made between the one or more attributes of the one or more recipes stored in the recipe repository and the one or more determined first cooking parameters of the cooking session profile and the classification of the food item in one or more of the one or more food item categories.

Figure 7:
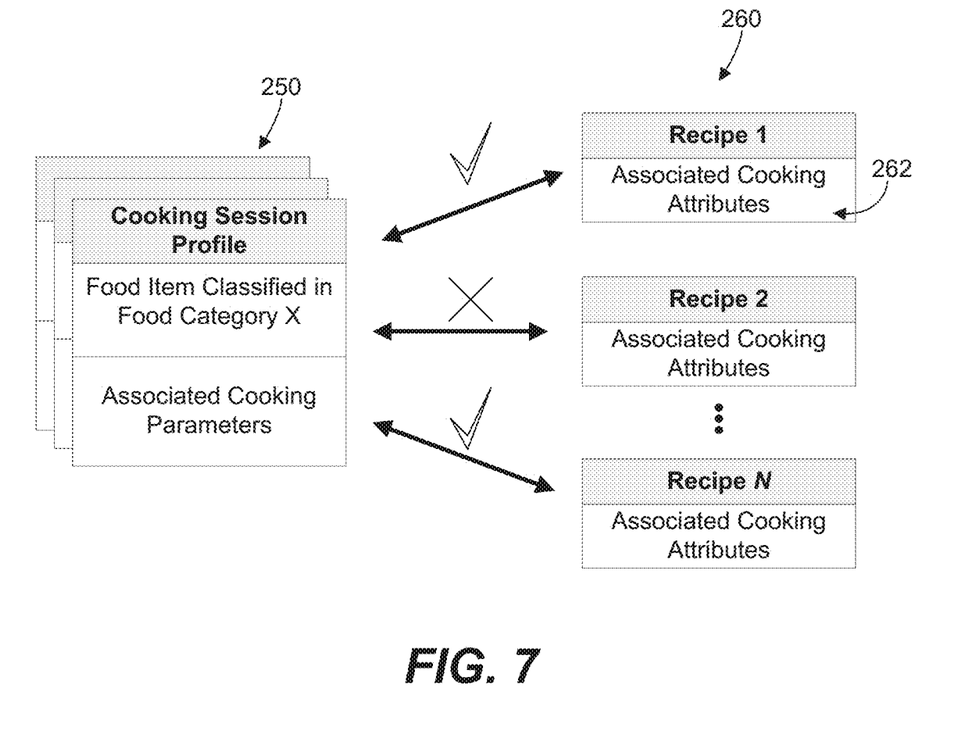
FIG. 7 provides a block diagram depicting one or more cooking session profiles being mapped to one or more recipes according to exemplary embodiments of the present subject matter.

For instance, FIG. 7 provides a block diagram depicting one or more cooking session profiles 250 being mapped to one or more recipes 260. For instance, the recipes 260 can be stored in recipe repository 176 or can be pulled from third-party recipe content providers as will be explained below. In this example, as depicted, the one or more cooking session profiles 250 can be mapped to the one or more recipes 260 by mapping the food item classification and associated cooking parameters (e.g., first and second cooking parameters 230, 220) with one or more attributes 262 associated with the recipes 260. Each recipe 260 has associated attributes 262 as depicted in FIG. 6. For instance, Recipe 1 has associated attributes, Recipe 2 has associated attributes, Recipe N has associated attributes, and so on. In some embodiments, mapping the cooking session profile 250 with the recipes 260 can include determining whether the classification of the food item of the cooking session profile 250 matches a classification attribute of the recipe 260 and whether the associated cooking parameters of the cooking session profile 250 match the attributes 262 of the recipes 260, and if so, the number of matches are determined. The machine-learned model 180 can set the weights for certain cooking parameters/attributes such that some matching parameters/attributes are given more weight when they match. For instance, a cookware parameter can be given more weight than a total cook time parameter, for example. Some of the attributes can be set as ranges so that the cooking parameters need not match the attribute exactly to be considered a match. Further, the food item classification and the attribute classification need not match exactly. Rather, certain attribute classifications of the recipes 260 can be set such that they match certain classifications of food items. In this way, recipes for side dishes or complementary items can be suggested to a user based on a given classified food item the user has cooked. For instance, if a ham is cooked by the user, certain green bean recipes and mashed potato recipes can be suggested to the user.

For the depicted example of FIG. 7, the food item classification and associated parameters of the cooking session profile 250 match the attributes 262 of Recipe 1, as denoted by the checkmark. That is, the food item classification and associated parameters of the cooking session profile 250 have a predetermined number of matches the attributes 262 of Recipe 1, and thus, the cooking session profile 250 and Recipe 1 are "matching." The food item classification and associated parameters of the cooking session profile 250 do not match the attributes 262 of Recipe 2, as denoted by the "X". Stated another way, the food item classification and associated parameters of the cooking session profile 250 do not have a predetermined number of matches with the attributes 262 of Recipe 2. The food item classification and associated parameters of the cooking session profile 250 match the attributes 262 of Recipe N, as denoted by the checkmark. Accordingly, based on the generated cooking session profile 250, and more particularly the food item classification and associated parameters of the generated cooking session profile 250, Recipe 1 and Recipe N are selected to be presented as suggested recipes while Recipe 2 is not.

In some implementations, the machine-learned model 180 can consider multiple cooking session profiles 250 (e.g., the current cooking session profile and previously generated cooking session profiles) when matching and selecting certain recipes. For instance, the machine-learned model 180 can determine, for a given food item classification, one or more indicator parameters indicative of first and or second parameters 230, 220 associated with the food item classification that are present in a predetermined number of cooking session profiles 250 associated with the given food item classification. In this way, the machine-learned model 180 can be trained over time to deliver suggested recipes that are most relevant and conducive to a user's specific cooking habits and style.

Further, in some implementations, recipes can be selected from third party recipe content providers 200, e.g., as shown in FIG. 5. For instance, in such implementations, the method (300) can include requesting, from one or more remote computing devices associated with third-party recipe content providers (e.g., from Recipe Content Provider 1, Recipe Content Provider 2, and so to Recipe Content Provider N) one or more recipe requests based at least in part on the classification of the food item in the one or more food item categories and the one or more determined first cooking parameters 230. For instance, the recipe requests can include data indicative of the one or more generated cooking session profiles. In some implementations, the one or more recipe requests can be based at least in part on the one or more received second cooking parameters 220.

The method (300) can also include receiving, from the one or more remote computing devices associated with the third-party recipe content providers, one or more recipes or recipe content based at least in part on the one or more recipe requests. For instance, recipes with attributes that "match" the classification of the food item and its associated parameters can be selected as one of the recipes or recipe content. Whether attributes and parameters match can be determined as described above. In such implementations, the machine-learned model determines the one or more suggested recipes based at least in part on the one or more recipes received from the one or more remote computing devices associated with the third-party recipe content providers.

At (312), with reference to FIG. 4, the method (300) includes causing, by the one or more computing devices, a display device to present the one or more suggested recipes to the user. For instance, as depicted in FIG. 5, the display device can be display device 152 of interactive assembly 150 (FIGS. 1 and 2). The suggested recipes 240 can be presented on display device 152 and presented to the user. In some implementations, additionally or alternatively, the display device is a component or display of a user device 280 communicatively coupled with the interactive assembly 150. The one or more computing devices or controller 170 can cause the display device (e.g., display device 152) to present the one or more suggested recipes 240 to the user in real time, e.g., during the cooking operation. That is, the controller 170 can receive the data 210, classify the food item, determine the one or more first cooking parameters 230, determine, by the machine-learned model 180, the one or more suggested recipes 240, and cause the one or more suggested recipes 240 to be displayed on the display device (e.g., display device 152) in real time. In yet other implementations, the suggested recipes 240 can be presented at another time, such as e.g., during the next cooking session or operation. Accordingly, upon presenting a user with suggested recipes, a user may select one or more of the suggested recipes to enjoy. As noted above, as the cooking system 100 learns more about particular food items the user cooks, the cooking system 100 can suggest different recipes (e.g., other main dishes, side dishes, new recipes) that the user may enjoy without need for the user to consult a recipe application or manually enter the recipes they are cooking.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking system, comprising:
a cooking appliance for cooking a food item, the cooking appliance having a forward heating element and a rear heating element spaced rearward of the forward heating element along a transverse direction;
an interactive assembly positioned directly above the cooking appliance along a vertical direction so that an open region is defined therebetween, the interactive assembly comprising:
an image capture device, the image capture device being a downward-looking image capture device pointed downward toward the cooking appliance so as to capture images of the food item being cooked by the cooking appliance, the image capture device is positioned between the forward heating element and the rear heating element along the transverse direction;
a display device;
one or more computing devices communicatively coupled with the display device and the image capture device, the one or more computing devices configured to:
receive, from the image capture device, data indicative of one or more captured images of the food item being cooked by the cooking appliance during a cooking operation;
determine one or more first cooking parameters based at least in part on the data, the one or more first cooking parameters indicative of a manner in which the food item is being cooked by the cooking appliance during the cooking operation;
determine, by a machine-learned model of the one or more computing devices, one or more suggested recipes to present to a user based at least in part on the one or more first cooking parameters determined; and
cause the one or more suggested recipes to be displayed on the display device.

2. The cooking system of claim 1, wherein the one or more computing devices are further configured to:
classify the food item into one or more food item categories of a plurality of food item categories based at least in part on the data, and
wherein in determining, by the machine-learned model of the one or more computing devices, the one or more suggested recipes to present to the user, the machine-learned model determines the one or more suggested recipes based at least in part on the classification of the food item in the one or more food item categories.

3. The cooking system of claim 2, wherein the one or more computing devices receive the data, classify the food item, determine the one or more first cooking parameters, determine, by the machine-learned model, the one or more suggested recipes, and cause the one or more suggested recipes to be displayed on the display device in real time.

4. The cooking system of claim 2, wherein the one or more computing devices are further configured to:
generate, by the machine-learned model of the one or more computing devices, a cooking session profile based at least in part on the classification of the food item in one or more of the plurality of food item categories and the one or more first cooking parameters determined; and
store the cooking session profile in a recipe repository operable to store a plurality of cooking session profiles.

5. The cooking system of claim 4, wherein in determining, by the machine-learned model of the one or more computing devices, the one or more suggested recipes to present to the user, the one or more computing devices are configured to:
map, by the machine-learned model of the one or more computing devices, the classification of the food item in one or more of the plurality of food item categories and the one or more determined first cooking parameters of the cooking session profile with one or more attributes of one or more recipes stored in the recipe repository; and
select, by the machine-learned model of the one or more computing devices, one or more of the one or more recipes stored in the recipe repository as the one or more suggested recipes to present to the user, wherein the one or more recipes stored in the recipe repository are selected as the one or more suggested recipes if a predetermined number of matches are made between the one or more attributes of the one or more recipes stored in the recipe repository and the one or more determined first cooking parameters of the cooking session profile and the classification of the food item in one or more of the one or more food item categories.

6. The cooking system of claim 2, wherein the one or more computing devices are further configured to:
request, from one or more remote computing devices associated with third-party recipe content providers, one or more recipe requests based at least in part on the classification of the food item in the one or more food item categories and the one or more determined first cooking parameters; and
receive, from the one or more remote computing devices associated with the third-party recipe content providers, one or more recipes based at least in part on the one or more recipe requests, and
wherein the machine-learned model determines the one or more suggested recipes based at least in part on the one or more recipes received from the one or more remote computing devices associated with the third-party recipe content providers.

7. The cooking system of claim 1, wherein the one or more first cooking parameters comprise one or more of i) a cookware parameter indicative of one or more cookware utilized by the user during the cooking operation to cook the food item; ii) a total cook time parameter indicative of a total time in which the food item was cooked during the cooking operation; iii) a food item amount parameter indicative of an amount or size of the food item cooked during the cooking operation; and iv) a food item movement parameter indicative of a number of times the food item is moved by user intervention during the cooking operation.

8. The cooking system of claim 1, wherein the data received by the one or more computing devices comprises one or more second cooking parameters indicative of the manner in which the food item is being cooked by the cooking appliance during the cooking operation, and wherein the machine-learned model of the one or more computing devices determines the one or more suggested recipes to present to the user based at least in part on the one or more received second cooking parameters.

9. The cooking system of claim 1, wherein the cooking appliance is a cooktop appliance.

10. The cooking system of claim 1, wherein the image capture device is operable to capture the one or more captured images as at least one of a plurality of still pictures and a video stream.

11. A method, comprising:
receiving, by one or more computing devices, data indicative of one or more captured images of a food item being cooked by a cooking appliance during a cooking operation, the one or more captured images of the food item being captured by an image capture device that is a downward-looking image capture device pointed downward toward the cooking appliance, the image capture device is positioned between a forward heating element and a rear heating element along a transverse direction defined by the cooking appliance;
classifying, by the one or more computing devices, the food item into one or more food item categories based at least in part on the received data;
determining, by the one or more computing devices, one or more first cooking parameters based at least in part on the received data, the one or more first cooking parameters indicative of a manner in which the food item is being cooked by the cooking appliance during the cooking operation; and
determining, by a machine-learned model of the one or more computing devices, one or more suggested recipes to present to a user based at least in part on the classification of the food item in one or more of the food item categories and the one or more determined first cooking parameters, the one or more suggested recipes being presented to the user on an interactive assembly positioned directly above the cooking appliance along a vertical direction so that an open region is defined therebetween.

12. The method of claim 11, further comprising:
generating, by the machine-learned model of the one or more computing devices, a cooking session profile based at least in part on the classification of the food item in one or more of the food item categories and the one or more determined first cooking parameters; and
storing, by the one or more computing devices, the cooking session profile in a recipe repository operable to store a plurality of cooking session profiles.

13. The method of claim 12, wherein determining, by the machine-learned model of the one or more computing devices, the one or more suggested recipes to present to the user comprises:
mapping, by the machine-learned model of the one or more computing devices, the classification of the food item in one or more of the food item categories and the one or more determined first cooking parameters of the cooking session profile with one or more attributes of one or more recipes stored in the recipe repository; and
selecting, by the machine-learned model of the one or more computing devices, one or more of the one or more recipes stored in the recipe repository as the one or more suggested recipes to present to the user, wherein the one or more recipes stored in the recipe repository are selected as the one or more suggested recipes if a predetermined number of matches are made between the one or more attributes of the one or more recipes stored in the recipe repository and the one or more determined first cooking parameters of the cooking session profile and the classification of the food item in one or more of the one or more food item categories.

14. The method of claim 11, further comprising:
causing, by the one or more computing devices, a display device to present the one or more suggested recipes to the user.

15. The method of claim 14, wherein the display device is a component of a user device communicatively coupled with an interactive assembly.

16. The method of claim 14, wherein the one or more computing devices cause the display device to present the one or more suggested recipes to the user in real time during the cooking operation.

17. The method of claim 11, wherein the data received by the one or more computing devices comprises one or more second cooking parameters indicative of the manner in which the food item is being cooked by the cooking appliance during the cooking operation, and
wherein the machine-learned model of the one or more computing devices determines the one or more suggested recipes to present to the user based at least in part on the one or more received second cooking parameters, and
wherein the one or more second cooking parameters comprise one or more of i) a temperature input parameter indicative of a temperature within a chamber defined by the cooking appliance during the cooking operation, ii) a heating element input parameter indicative of an amount of thermal energy provided by a heating element of the cooking appliance to the food item during the cooking operation, iii) a recipe input parameter indicative of preparation instructions for cooking the food item, and iv) a cooking setting input parameter indicative of one or more cooking settings used by the cooking appliance to cook the food item during the cooking operation.

18. The method of claim 11, wherein the one or more first cooking parameters comprise one or more of i) a cookware parameter indicative of one or more cookware utilized by the user during the cooking operation to cook the food item; ii) a total cook time parameter indicative of a total time in which the food item was cooked during the cooking operation; iii) a food item amount parameter indicative of an amount or size of the food item cooked during the cooking operation; and iv) a food item movement parameter indicative of a number of times the food item is moved by user intervention during the cooking operation.

19. The method of claim 11, further comprising:
requesting, from one or more remote computing devices associated with third-party recipe content providers, one or more recipe requests based at least in part on the classification of the food item in the one or more food item categories and the one or more determined first cooking parameters; and
receiving, from the one or more remote computing devices associated with the third-party recipe content providers, one or more recipes based at least in part on the one or more recipe requests, and
wherein the machine-learned model determines the one or more suggested recipes based at least in part on the one or more recipes received from the one or more remote computing devices associated with the third-party recipe content providers.

20. A cooking system, comprising:
a cooking appliance having one or both of an oven and a cooktop appliance;
an interactive assembly, comprising:
   an image capture device;
   a display device;
   one or more computing devices communicatively coupled with the display device and the image capture device, the one or more computing devices configured to:
      receive, from the image capture device, data indicative of one or more captured images of the food item being cooked by the cooking appliance during a cooking operation;
      determine one or more cooking parameters based at least in part on the data, the one or more cooking parameters indicative of a manner in which the food item is being cooked by the cooking appliance during the cooking operation;
      determine, by a machine-learned model of the one or more computing devices, one or more suggested recipes to present to a user based at least in part on the one or more cooking parameters determined, wherein in determining, by the machine-learned model, the one or more suggested recipes to present to the user, the one or more computing devices are configured to:
         map, by the machine-learned model, a classification of the food item in one or more of a plurality of food item categories and the one or more determined cooking parameters with one or more attributes of one or more recipes stored in a recipe repository; and
         select, by the machine-learned, one or more of the one or more recipes stored in the recipe repository as the one or more suggested recipes to present to the user, wherein the one or more recipes stored in the recipe repository are selected as the one or more suggested recipes if a predetermined number of matches are made between the one or more attributes of the one or more recipes stored in the recipe repository and the one or more determined cooking parameters and the classification of the food item in one or more of the one or more food item categories; and
      cause the one or more suggested recipes to be displayed on the display device.

\* \* \* \* \*